(12) United States Patent
Milillo et al.

(10) Patent No.: US 6,421,767 B1
(45) Date of Patent: Jul. 16, 2002

(54) METHOD AND APPARATUS FOR MANAGING A STORAGE SYSTEM USING SNAPSHOT COPY OPERATIONS WITH SNAP GROUPS

(75) Inventors: Michael Steven Milillo, Louisville; Kent D. Prosch, Boulder, both of CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/511,886

(22) Filed: Feb. 23, 2000

(51) Int. Cl.$^7$ ................................................ G06F 12/16
(52) U.S. Cl. ..................... 711/162; 711/111; 711/112; 711/114; 711/152; 711/161; 707/204
(58) Field of Search ........................... 711/4, 111, 112, 711/114, 152, 161, 162, 163; 707/204

(56) References Cited

U.S. PATENT DOCUMENTS

| | | | | |
|---|---|---|---|---|
| 5,239,659 A | * | 8/1993 | Rudeseal et al. | 714/6 |
| 5,403,639 A | * | 4/1995 | Belsan et al. | 707/204 |
| 5,410,667 A | * | 4/1995 | Belsan et al. | 711/114 |
| 6,038,639 A | * | 3/2000 | O'Brien et al. | 711/114 |
| 6,237,008 B1 | * | 5/2001 | Beal et al. | 707/204 |
| 6,253,295 B1 | * | 6/2001 | Beal et al. | 711/162 |

* cited by examiner

*Primary Examiner*—Than Nguyen
(74) *Attorney, Agent, or Firm*—Carstens, Yee & Cahoon, L.L.P.

(57) ABSTRACT

A method and apparatus in a data processing system for managing data access to a plurality of storage devices. The present invention may be applied to copy operations involving virtual tracking. The plurality of storage devices is grouped into a set of groups. Responsive to a request for a copy operation to copy data from a first storage device to a second storage device, a determination is then made as to whether the first storage device and the second storage device are in the same group within the plurality of groups. Responsive to the first storage device and the second storage device being in the same group, a data file pointer to the original data is stored in a data structure for the second storage device. Responsive to an absence of the first storage device and the second storage device being in the same group, occurrence of the copy operation is prevented.

39 Claims, 10 Drawing Sheets

FIG. 5

| | SG ID | NUM VOLS | VOLUME ID | VOLUME ID | VOLUME ID | VOLUME ID | ... | ... | VOLUME ID |
|---|---|---|---|---|---|---|---|---|---|
| SG 1 | aaaaa | n | X1 | X2 | X3 | X4 | | | Xn |
| SG 2 | bbbbb | m | Y1 | Y2 | Y3 | Y4 | | | Yn |
| SG 3 | ccccc | o | Z1 | Z2 | Z3 | Z4 | | | Zn |
| ... | | | | | | | | | |
| ... | | | | | | | | | |
| ... | | | | | | | | | |
| ... | | | | | | | | | |
| SG n | | | | | | | | | |

500

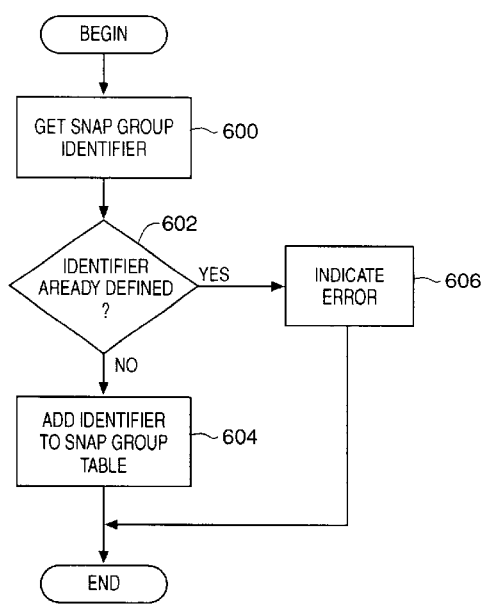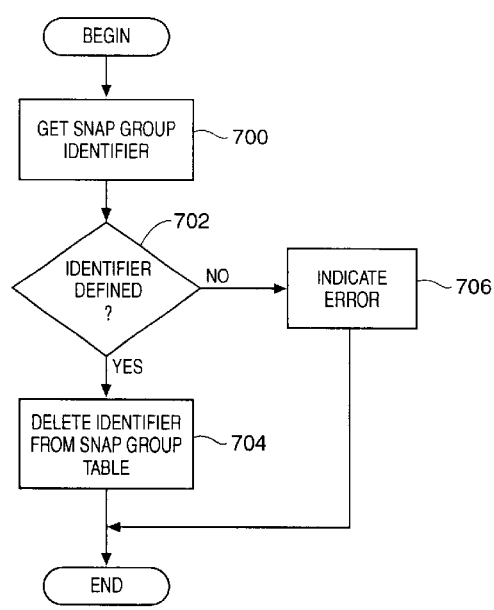

METHOD AND APPARATUS FOR MANAGING A STORAGE SYSTEM USING SNAPSHOT COPY OPERATIONS WITH SNAP GROUPS

BACKGROUND OF THE INVENTION

1. Technical Field

The present invention relates generally to an improved data processing system and in particular to a data storage subsystem for use with a data processing system. Still more particularly, the present invention provides a method and apparatus for managing snapshot copy operations in a data processing system.

2. Description of Related Art

In computer systems and data storage subsystems, one problem is performing a data file copy operation in a manner that minimizes the use of processing resources and data storage memory. Previously, data files were copied in their entirety by the processor, such that two exact copies of the selected data file were resident in the data storage memory. This operation consumed twice the amount of memory for the storage of two identical copies of the data file. Additionally, this operation required the intervention of the processor to effect the copy of the original data file.

A data file snapshot copy is an improvement over this type of copy process. This snapshot copy process includes a dynamically mapped virtual data storage subsystem. This subsystem stores data files received from a processor in back-end data storage devices by mapping the processor assigned data file identifier to a logical address that identifies the physical storage location of the data. This dynamically mapped virtual data storage subsystem performs a copy of a data file by creating a duplicate data file pointer to a data file identifier in a mapping table to reference the original data file. In this dynamically mapped virtual data storage subsystem, the data files are referred to as a collection of "virtual tracks" and each data file is identified by unique virtual track addresses (VTAs). The use of a mapping table provides the opportunity to replace the process of copying the entirety of a data file in the data storage devices with a process that manipulates the contents of the mapping table. A data file appears to have been copied if the name used to identify the original data file and the name used to identify the copy data file are both mapped to the same physical data storage location.

This mechanism enables the processor to access the data file via two virtual track addresses while only a single physical copy of the data file resides on the back-end data storage devices in the data storage subsystem. This process minimizes the time required to execute the copy operation and the amount of memory used since the copy operation is carried out by creating a new pointer to the original data file and does not require any copying of the data file itself.

One implementation of the snapshop copy process provides a two-table approach. One table has table entries for each virtual device track pointing to another table containing the physical track location for the entry. Each physical track table entry identifies the number of virtual track entries that point to this entry by use of a reference count mechanism. Each virtual track entry that points to the physical track is called a "reference." The reference count increments when a new virtual track table entry pointer points to this physical entry (e.g. snap) and the reference count decrements when a virtual track table entry pointer is removed (e.g. update source after a snap). When a reference count is zero, then that physical track can be deleted from the back-end since it is known that there are no references to the physical track.

Although each back-end track's reference counter is normally maintained, times are present when the counters are known to be inaccurate and must be recalculated (regenerated) by scanning the entire list of virtual volume tracks. For example, situations occur during snapshot copy operations and recovery operations that require the regeneration of reference counts. Reference count regeneration is the process performed to determine how many virtual tracks refer to (i.e. references) each track stored on the back-end.

As the number of virtual volumes grows, the time it takes to perform reference count regeneration grows at a significant rate resulting in warm-start times that are unacceptable. For even 1024 volumes and larger back-end capacities, processor memory present is usually insufficient to accumulate all counters simultaneously needed to scan the virtual volume tracks once. As a result, to perform reference count generation in this case, multiple scans through the virtual volume tracks are needed. Multiple scans can cause a performance penalty in the storage subsystem.

In addition to problems with reference counts, presently available snapshot copy operations are unable to provide quotas on the number of operations or restrictions based on the locality of sub-systems in a distributed network.

Therefore, it would advantageous to have an improved method and apparatus for managing a data file storage system using snapshot copy operations.

SUMMARY OF THE INVENTION

The present invention provides a method and apparatus in a data processing system for managing data access to a plurality of storage devices. In particular, the present invention may be applied to copy operations involving virtual tracking. The plurality of storage devices is grouped into a set of groups. Responsive to a request for a copy operation to copy data from a first storage device to a second storage device, a determination is then made as to whether the first storage device and the second storage device are in the same group within the plurality of groups. Responsive to the first storage device and the second storage device being in the same group, a data file pointer to the original data is stored in a data structure for the second storage device. Responsive to an absence of the first storage device and the second storage device being in the same group, occurrence of the copy operation is prevented. With these groups, regenerating reference counts may be performed by snap groups, minimizing the resources needed because the number of counters needed to track references is at most the number of virtual tracks in a group. In this manner all of the virtual tracks need not be scanned at once. Also, only a single scan of physical tracks is required.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a diagram of a snap group table in accordance with a preferred embodiment of the present invention;

FIG. 6 is a flowchart of a process for adding a snap group in accordance with a preferred embodiment of the present invention;

FIG. 7 is a flowchart of a process for deleting a snap group in accordance with a preferred embodiment of the present invention;

DETAILED DESCRIPTION OF THE PREFERRED EMBODIMENT

Figure 1:
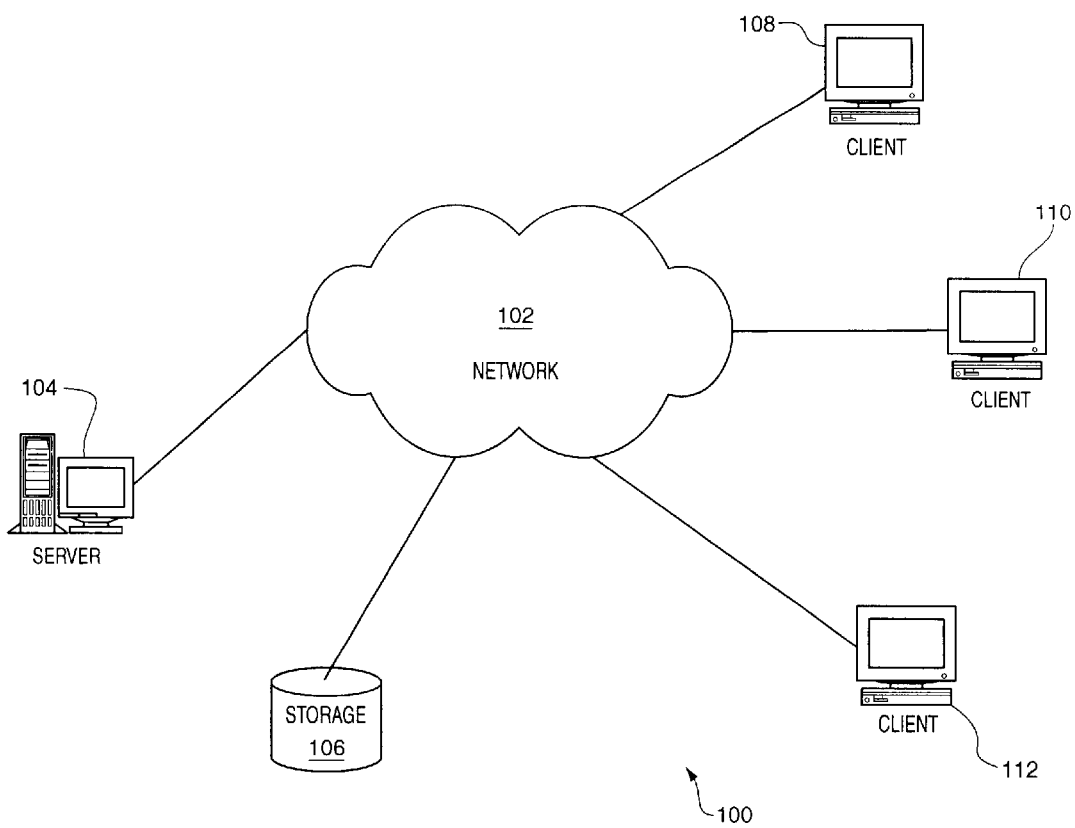
FIG. 1 is a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage subsystem 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. Distributed data processing system 100 may be implemented as one or more of a number of different types of networks, such as, for example, an intranet, a local area network (LAN), or a wide area network (WAN). Network 102 contains various links, such as, for example, fiber optic links, packet switched communication links, enterprise systems connection (ESCON) fibers, small computer system interface (SCSI) cable, wireless communication links. In these examples, storage subsystem 106 may be connected to server 104 using ESCON fibers.

FIG. 1 is intended as an example and not as an architectural limitation for the present invention.

Figure 2:
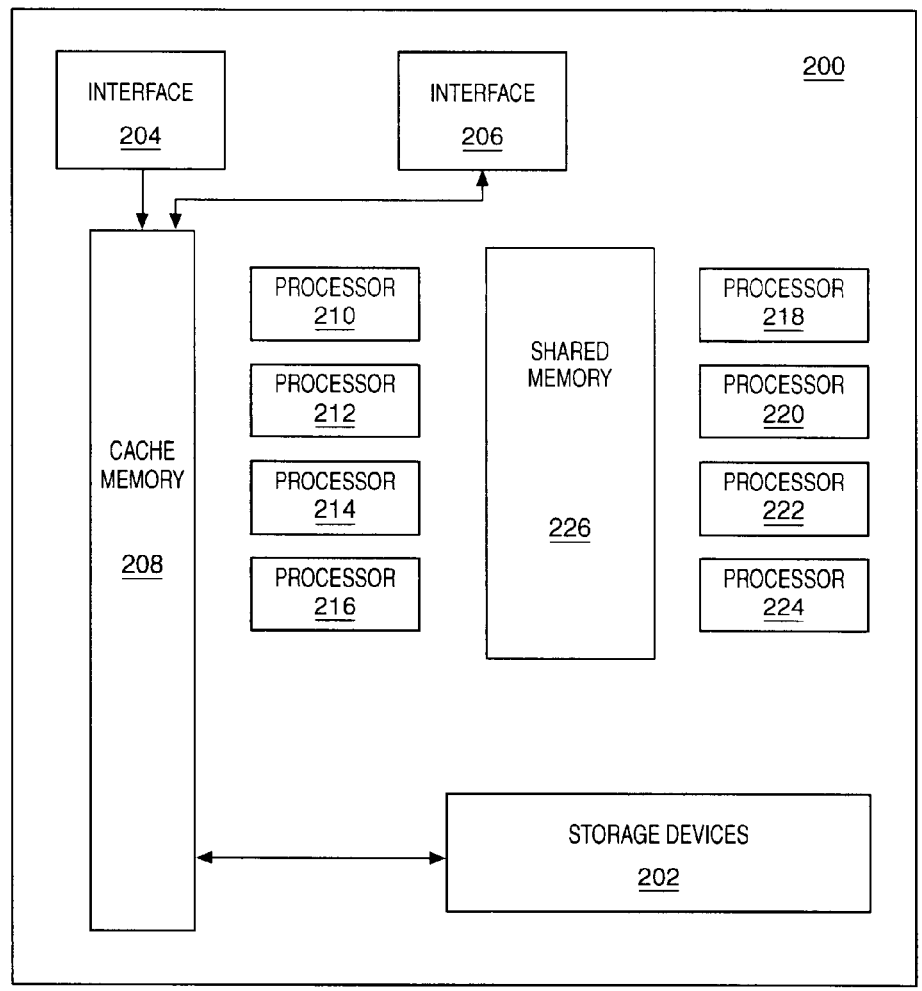
FIG. 2 is a block diagram of a storage subsystem in accordance with a preferred embodiment of the present invention.

Turning next to FIG. 2, a block diagram of a storage subsystem is depicted in accordance with a preferred embodiment of the present invention. Storage subsystem 200 may be used to implement storage subsystem 106 in FIG. 1. As illustrated in FIG. 2, storage subsystem 200 includes storage devices 202, interface 204, interface 206, cache memory 208, processors 210–224, and shared memory 226.

Interfaces 204 and 206 in storage subsystem 200 provide a communication gateway through which communication between a data processing system and storage subsystem 200 may occur. In this example, interfaces 204 and 206 may be implemented using a number of different mechanisms, such as ESCON cards, SCSI cards, fiber channel interfaces, modems, network interfaces, or a network hub. Although the depicted example illustrates the use of two interface units, any number of interface cards may be used depending on the implementation.

In this example, storage subsystem 200 is a shared virtual array. Storage subsystem 200 is a virtual storage system in that each physical storage device in storage subsystem 200 may be represented to a data processing system, such as client 104 in FIG. 1, as a number of virtual devices. In this example, storage devices 202 are a set of disk drives set up as a redundant array of inexpensive disks (RAID) system. Of course, other storage devices may be used other than disk drives. For example, optical drives may be used within storage devices 202. Further, a mixture of different device types may be used, such as, disk drives and tape drives.

Data being transferred between interfaces 204 and 206 and storage devices 202 are temporarily placed into cache memory 208. Additionally, cache memory 208 may be accessed by processors 210–224, which are used to handle reading and writing data for storage devices 202. Shared memory 226 is used by processors 210–224 to handle and track the reading and writing of data to storage devices 202. In particular, processor 210–224 are used to execute instructions for routines used in snapshot copy operations.

The present invention provides a method, apparatus, and computer implemented instructions for providing reference count regeneration in a storage subsystem using snapshot copy operations. Reference count regeneration is a process used to determine how many virtual tracks refer to each track stored in the storage devices in the subsystem. The present invention reduces the amount of memory needed and eliminates the need for multiple scans to perform reference count regeneration. This advantage is achieved by grouping source and destination volumes allowed for a particular snapshot copy operation, also referred to as a "snap operation".

Figure 3:
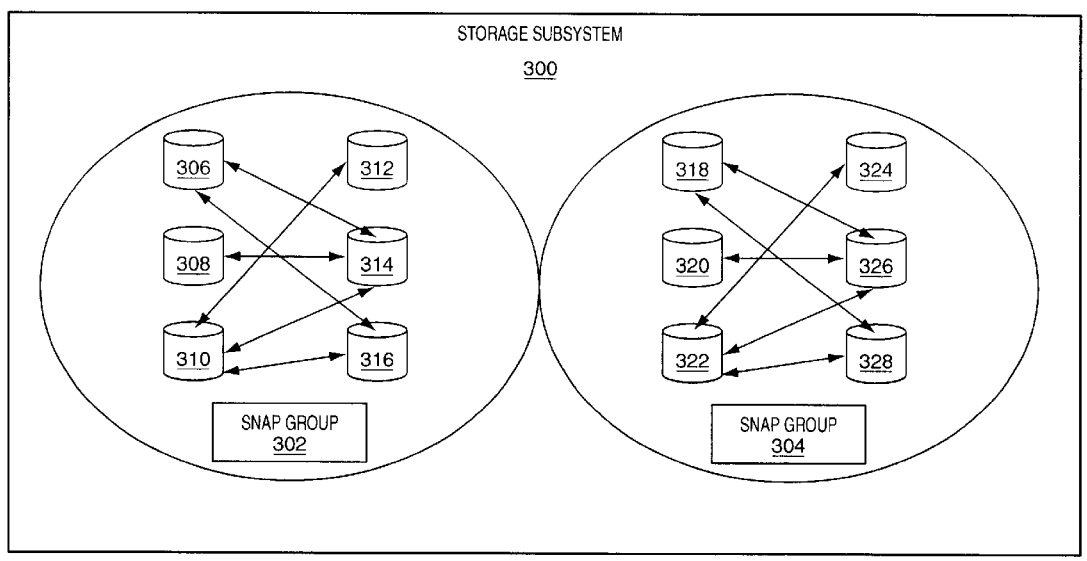
FIG. 3 is an illustration of snap groups in accordance with a preferred embodiment of the present invention.

Turning next to FIG. 3, an illustration of snap groups is depicted in accordance with a preferred embodiment of the present invention. Storage subsystem 300, in this example, includes two snap groups: snap group 302 and snap group 304. Snap group 302 contains volumes 306–316, while snap group 304 contains volumes 318–328. In these examples, these volumes are virtual volumes in storage subsystem 300.

Each of the virtual volumes belongs to a snap group. Although two snap groups are illustrated in subsystem 300 with six volumes in each snap group, the number and size of snap groups may vary depending on the resources available for reference recount regeneration. The number of counters available during reference count regeneration is a factor limiting the size of a snap group. Further, not all snap groups must have the same number of volumes.

By creating snap groups, a table containing reference counts, such as a virtual track table may be scanned only once to accumulate all of the reference counts. In the depicted example, pages containing the virtual track table may be scanned only once. This scanning of the virtual track table may only be performed once because the virtual track table entries for a snap group have only references to physical track table entries that are within the snap group. As a result, although the reference counts are regenerated separately for each snap group, each track entry is read only once regardless of the number of snap groups that are present. As a result, only a single scan through the tracks is required.

Further, the use of snap groups restricts which virtual volumes are allowed to be paired for a snapshot copy operation. According to the present invention, when selecting a source virtual volume for a snapshot copy operation, the target virtual volume must be a virtual volume within the same snap group rather than any virtual volume in the storage subsystem.

In these examples, the number of virtual volumes that can participate in a snap group is restricted to the maximum number of reference counters that can be held in memory during reference count regeneration. The benefit of snap groups is that a set of virtual volumes may be identified for scanning when regenerating a set of track reference counts.

Figure 4:
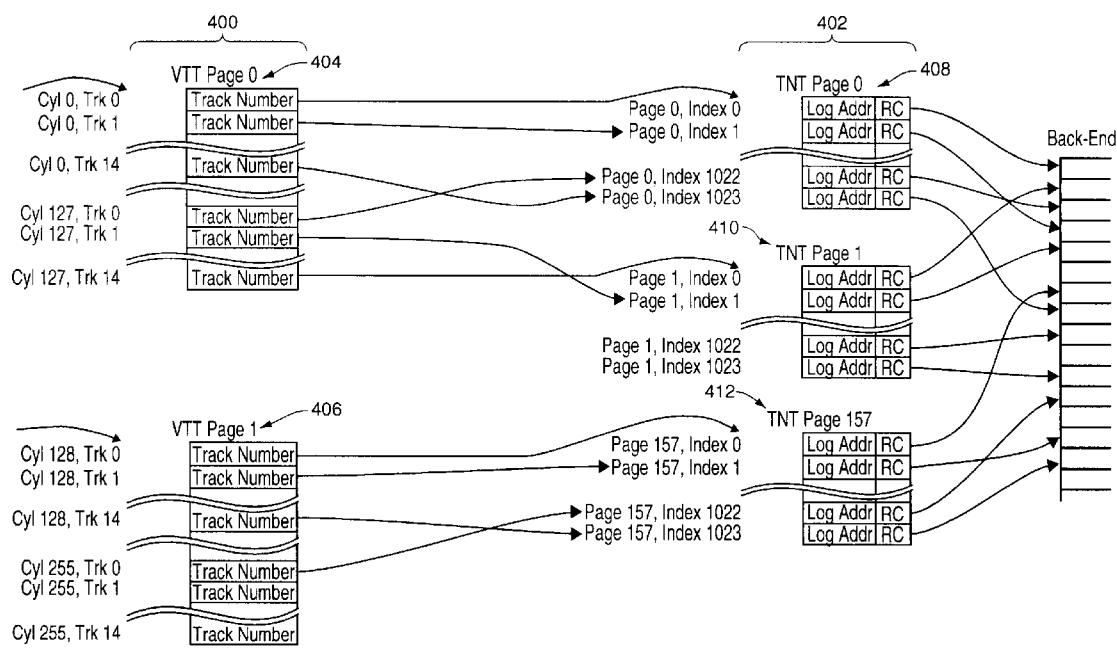
FIG. 4 is a diagram of a virtual track table and a track number table in accordance with a preferred embodiment of the present invention.

Turning next to FIG. 4, a diagram of a virtual track table and a track number table are depicted in accordance with a preferred embodiment of the present invention. Virtual track table 400 and track number table 402 are tables that may be used in a storage subsystem by a processor, such as processors 210–224 in FIG. 2.

Virtual track table 400 provides the mapping from the individual virtual addresses provided by a processor to an immutable name, which is used to index the corresponding entry track number table 402. This table provides the mapping from the immutable name stored in the virtual track table to the logical address, which identifies the physical storage location in the back-end data storage devices that contain the received virtual track instance.

In the depicted example, the processor stores virtual tracks, which are associated with a virtual device in the data storage subsystem, such as storage subsystem 106 in FIG. 1. The virtual track address, assigned by the processor to a virtual track, identifies a particular track by assigning the track a virtual cylinder number and a virtual track number. For each virtual device defined by the processor, the data storage subsystem stores a list of addresses, which point to virtual track table pages, such as pages 404 and 406. Each page contains a predetermined number (for example: 8192) of byte segments of memory. The physical storage for these virtual track table pages may be within a cache memory, a shared memory, storage devices, or a combination of these locations depending on the implementation.

These virtual track table pages each contain an entry for each virtual track. Also located within each virtual track table page is data, which defines the logical address of a copy of the virtual track table page comprising a virtual track table page instance, which has been written on back-end data storage devices during the snapshot copy or write operation. These back-end storage devices may be, for example, storage devices 202 in storage subsystem 200 in FIG. 2. This logical address identifies the physical storage location in the back-end data storage devices that contains the most recently written instance of the present virtual track table page.

Each of the virtual track table pages in virtual track table 400 include table entries. These entries are indexed by virtual cylinder number and virtual track number within the virtual device (for example: Cyl 0, Trk 0). The virtual track table entries include track numbers as illustrated in FIG. 4.

Track number table 402 is a linear table that maps each track number representing a virtual track instance to a logical address, which identifies the physical storage location holding the virtual track instance on the back-end data storage devices. In these examples, the track number table is organized much like the virtual track table, with portions of the table segmented into the track number table pages, such as pages 408–412. Track number table 402 is initially indexed with the track number partition, which selects a list of track number table page addresses. The track number segment index then identifies the appropriate track number table page address from the list of track number table page addresses.

A track number table page address points to a track number table page, which contains a predetermined number (for example: 8192) of byte segments of memory. These track number table pages each contain an entry for each virtual track within a 1024 track number boundary. As with the virtual track table, the physical storage for these virtual track tables may be within a cache memory, within a controller, within data storage devices, or a combination of these locations as a matter of engineering choice.

With respect to referencing track number table 402 from virtual track table 400, the track number contains the data required to access a corresponding entry contained in track number table 402. The track number is a unique identifier, pointing to a single entry in the track number table. This table contains data used to identify the physical storage location in the back-end data storage devices containing the received virtual track instance.

Track number table 402 in these examples contains a reference count in the RC portion of each entry. These reference counts are the reference counts used by the processes of the present invention in performing reference count regeneration.

More information on data file management for snapshot copy operations may be found in Data File Storage Management System for Snapshot Copy Operations, filed on Sep. 9, 1999, Ser. No. 08/925,787, which is assigned to the same assignee and which is incorporated herein by reference.

Next, FIG. 5 is a diagram of a snap group table depicted in accordance with a preferred embodiment of the present invention. Table 500 contains entries for snap groups in these examples. Each entry includes a snap group identifier (SG ID). The number of volumes (Num Vols) is identified for each entry in table 500. The identification for each volume (Volume ID) is also contained within each entry in this example. Of course, the number of columns needed for volume identifiers may vary depending on the number of volumes within a snap group. Table 500 also may be implemented using pages, like virtual track table 400 and track number table 402 in FIG. 4. Further, this table may be stored in different locations depending on the implementation.

To implement snap groups in this example, each volume has an attribute named snap group identifier. Snap groups are created by the end user or defaulted by the disk subsystem. Commands are used to add a virtual volume to a snap group and delete a virtual volume from a snap group. When a virtual volume is added to a snap group, the volume's tracks are checked to make sure that no tracks with a track number are present from outside the virtual volume. If tracks from outside the virtual volume are present, then the command to add the virtual volume is rejected. Tracks outside of the group have to be re-written or deleted before this virtual volume will be allowed to be placed in a particular snap group.

When a snap group is added, an entry in the table is set up with the snap group identifier and the number of volumes set to zero. As volumes are added to a snap group, the volume identifier is added to the row of the appropriate snap group. In these examples, snap groups in table 500 in FIG. 5 are put in sorted order to make the lookup efficient. Volume identifiers are also in sorted order within a snap group to make the lookup of their identifiers efficient.

In addition, each volume defined in the disk subsystem has the snap group identifier added to the control structures for the volume so that snap operations can quickly determine if a snap operation has a source volume and target volume in the same snap group.

The virtual track table identifies the track number for all the tracks of all virtual volumes. The track number is used to index into the track number table to determine the physical location of the referenced track. When an add volume to snap groups command is processed, a determination is made as to whether all the tracks in the volume to be added are within the snap group. This determination is made by scanning the virtual track table. Each track in the volume to be added must either be "empty" (i.e. it has never been written), have a track number that is the same as the virtual track address (i.e. it is written and has not been the target of a snap operation), or have a track number that is the same as a virtual track address for some volume in the snap group to which this volume is being added.

If this condition is true for each virtual track on the volume, then the volume cannot be added to the snap group.

When snap operations are performed, each physically stored track must be marked as "in use" by the virtual track that uses the physical track. This marking is accomplished in this example by maintaining a reference count per physical track. When the reference count is zero, this means that no virtual tracks referring to the physical track are present and, thus, the physical space occupied by the physical track can be reused to store other tracks.

When the control tables containing the reference count information are damaged or lost, then the reference count for each physical track are reconstructed by scanning all of the data on the physical devices to determine which virtual tracks refer to each physical track. As the physical tracks are scanned, if any track can be referred to by any virtual track, then two solutions are present: either counters are maintained for all possible virtual volumes at the cost of more memory space or multiple passes through the physical tracks are performed at the cost of longer processing times. Snap groups restrict which volumes can refer to a specific physical track. As a result, the subsystem can scan a subset of the tracks and reconstruct a snap group's worth of reference counts. This mechanism allows a small number of counters to be used, reducing memory demands in regenerating reference counts. The number of counters is equal to the maximum number of volumes allowed in a snap group. Snap groups also allow only one scan through the physical tracks to be performed. The scan is performed on a snap group basis. For each snap group, those physical tracks whose track number is equal to the virtual track addresses that are part of the snap group are scanned together. Then, the number of scans is equal to the number of snap groups, but the scans do not overlap. Thus, only a single scan through the physical tracks is required.

With reference now to FIG. 6, a flowchart of a process for adding a snap group is depicted in accordance with a preferred embodiment of the present invention. FIG. 6 illustrates a process used to add a snap group. This process is initiated in response to a command to add a snap group. The input parameter, in this process, is a snap group identifier.

The process begins by obtaining the snap group identifier (step 600). A determination is made as to whether the identifier has already been defined for the snap group (step 602). This determination may be made by checking a snap group table, such as snap group table 500 in FIG. 5. If an identifier has not been defined, the process then adds the identifier to the snap group table (step 604) with the process terminating thereafter. With reference again to step 602, if an identifier has already been defined, an error is indicated (step 606) with the process terminating thereafter.

Turning next to FIG. 7, a flowchart of a process for deleting a snap group is depicted in accordance with a preferred embodiment of the present invention. FIG. 7 illustrates deleting a snap group from a snap group table. This process is initiated by a command to delete a snap group. A snap group identifier is the input parameter for this process.

The process begins by obtaining the snap group identifier (step 700). A determination is made as to whether the snap group identifier is defined in the table (step 702). If the snap group identifier is identified in the table, this identifier is deleted from the snap group table (step 704) with the process terminating thereafter. With reference again to step 702, if the identifier is undefined in the snap group table, an error is indicated (step 706) with the process terminating thereafter.

Figure 8:
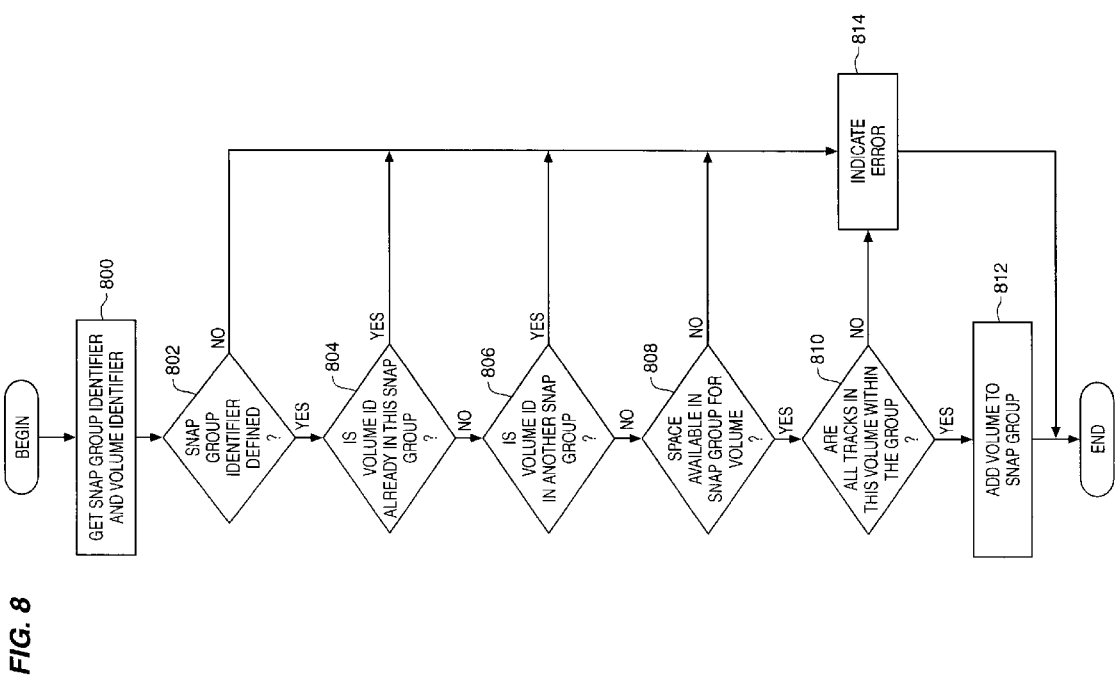
FIG. 8 is a flowchart of a process for adding a volume to a snap group in accordance with a preferred embodiment of the present invention.

With reference to FIG. 8, a flowchart of a process for adding a volume to a snap group is depicted in accordance with a preferred embodiment of the present invention. FIG. 8 illustrates a process used to add a volume to a snap group table in which a snap group identifier and a volume identifier are used as input parameters.

The process begins by obtaining the snap group identifier and the volume identifier (step 800). Next, a determination is made as to whether the snap group identifier has been defined in the snap group table (step 802). If the snap group identifier is defined, a determination is made as to whether the volume identifier is already present for this snap group in the snap group table (step 804). If the volume identifier is not already present in the snap group, a determination is made as to whether the volume identifier is present in another snap group in the snap group table (step 806). If the volume identifier is not present in another snap group, a determination is made as to whether space is available in the snap group for the volume (step 808). If space is available, a determination is made as to whether all of the tracks in this volume are within the snap group (step 810). For example, in a snap group containing volumes A1 and A2, a snapshot copy operation is made from volume A1 to volume A2. If an attempt is made to move volume A2 out of the snap group and add volume A2 to another snap group, then all of the tracks would not be in the same volume because the tracks originate from volume A1. If the tracks on volume A2 were deleted or rewritten to be resident on volume A2, then volume A2 could be allowed into the other snap group. If all of the tracks on the volume are within the snap group, the volume is added to the snap group (step 812) with the process terminating thereafter.

With reference again to step 810, if one or more tracks are not within the snap group, an error is indicated (step 814)

with the process terminating thereafter. Turning back to step 808, if space is not available within the snap group for the volume, the process proceeds to step 814 to indicate an error. The process also proceeds to step 814 from step 806 and step 804 if the volume identifier is already present in any snap group in the snap group table. Further, with reference again to step 802, if the snap group identifier has not been defined in the snap group table, the process proceeds to step 814 to indicate an error.

Figure 9:
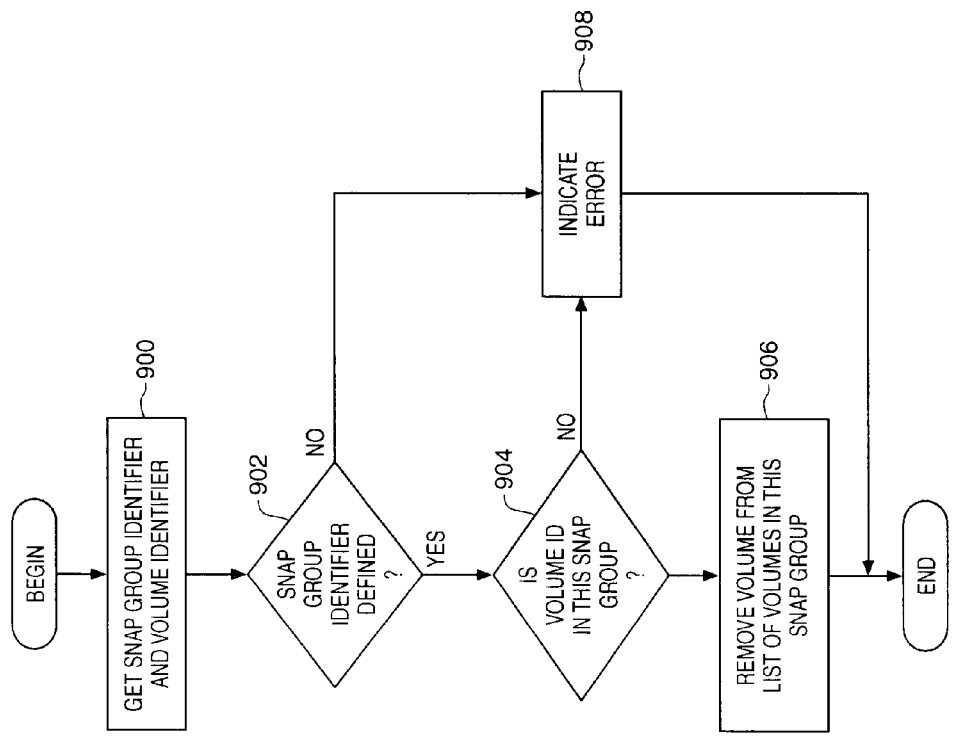
FIG. 9 is a flowchart of a process for deleting a volume from a snap group in accordance with a preferred embodiment of the present invention.

Turning next to FIG. 9, a flowchart of a process for deleting a volume from a snap group is depicted in accordance with a preferred embodiment of the present invention. FIG. 9 illustrates a process to delete a volume from a snap group from the snap group table in response to a command to delete the volume. A snap group identifier and a volume identifier are used as input parameters for this process.

The process begins by obtaining a snap group identifier and a volume identifier (step 900). A determination is made as to whether the snap group identifier has been defined in the snap group table (step 902). If the snap group identifier is defined in the snap group table, a determination is made as to whether the volume identifier is within this snap group in the snap group table (step 904). If the volume identifier is within this snap group, the volume identifier is removed from the list of volume identifiers in this snap group (step 906) with the process terminating thereafter.

With reference again to step 904, if the volume identifier is not present in the snap group, an error is indicated (step 908) with the process terminating thereafter. Referring again to step 902, if the snap group identifier is undefined within the snap group table, the process also proceeds to step 908 as described above.

Figure 10:
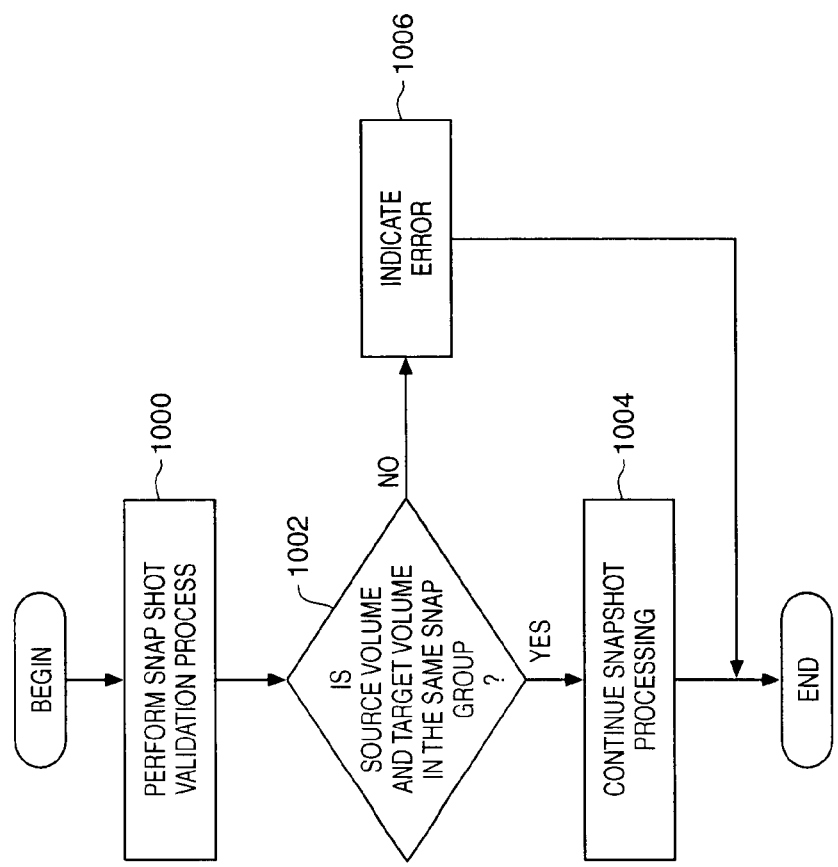
FIG. 10 is a flowchart of a process for validating volumes in accordance with a preferred embodiment of the present invention.

With reference now to FIG. 10, a flowchart of a process for validating volumes is depicted in accordance with a preferred embodiment of the present invention. This process is performed prior to performing a snapshot copy operation.

The process begins by performing a snapshot validation process (step 1000). This validation process in step 1000 refers to checks made by the subsystem to verify that the snapshot copy request follows the rules required to perform a successful snapshot copy operation. For a general snapshot copy operation, a number of checks are typically performed. These checks include, for example: (1) ensuring that the source volume and the target volume are configured, (2) determining whether the extents for the source volume and the target volume are within the limits of the volume, (3) whether the user is able to issue a "snap from" command to the appropriate extent on the source volume, (4) whether the user is able to issue a "snap to" command to the appropriate extent on the target volume, (5) insuring that the extents specified for the source volume and the target volume have the same number of tracks, and (6) ensuring that no part of both extents are involved with a different snapshot copy operation still in progress.

Thereafter, a determination is made as to whether the source volume and the target volume are in the same snap group (step 1002). If the source volume and the target volume are in the same snap group, the snapshot copy processing continues (step 1004) with the process terminating thereafter. The snapshot copy processing in this example involves the actual copying of the pointers. With reference again to step 1002, if the source volume and the target volume are not in the same snap group, an error is indicated (step 1006) with the process terminating thereafter. This step prevents snapshot copy operations from occurring between volumes in different snap groups. This allows for faster reconstruction of references during reference count regeneration. This mechanism also provides for an ability to restrict snapshot copy operations based on locality, as well as placing quotas on the number of snapshot copy operations.

The reference count regeneration process consists of the recreation of the total count of virtual tracks that refer to each physical track stored on the physical storage. For each physical track on the physical storage, the count begins at one when the host initially writes the track. Snapshot copy operations cause the counts to increase. Write operations to a virtual track and delete operations of a virtual track decrease counts. When the physical track has a reference count of zero, then the space for the physical track can be reused for another track. In these examples, the counts may be tracked using counters associated with the physical tracks.

During some failure scenarios, it is possible that the reference counts that are stored in tables on the physical storage may be lost or inconsistent and the reference count for each physical track needs to be recalculated.

Basically, reference count regeneration needs to scan all the virtual tracks in the subsystem and maintain a count of which physical tracks are referenced by each virtual track. With the current implementation without snap groups, no mechanism is present to predict or limit which physical track a particular virtual track will reference. As a result, either counters must be maintained for all possible virtual tracks on a single scan of the virtual tracks or the virtual tracks have to be scanned more than once depending on the number of counters that are maintained. Maintaining a counter for each physical track consumes large amounts of memory and can be a limiting factor on the number of tracks supported. Scanning the virtual tracks involves reading virtual track information from physical storage and is a very slow process. Multiple scans of the virtual tracks creates an unacceptable performance degradation for this operation.

With the snap group implementation of the present invention, the number of counters to maintain is controlled by the number of tracks in the snap group. Each counter is associated with a physical track in these examples. The scan of the virtual tracks within the snap group cannot contain a reference to a physical track outside of the snap group. The number of physical tracks cannot be more than the number of virtual tracks in a snap group in the present invention. Thus, the number of virtual tracks forms the upper limit for the number of possible physical tracks that may be associated with a counter. As a result, the number of counters is limited and the scan of the entire virtual track information is performed once with the scan broken into "n" pieces where "n" is the number of snap groups.

Figure 11:
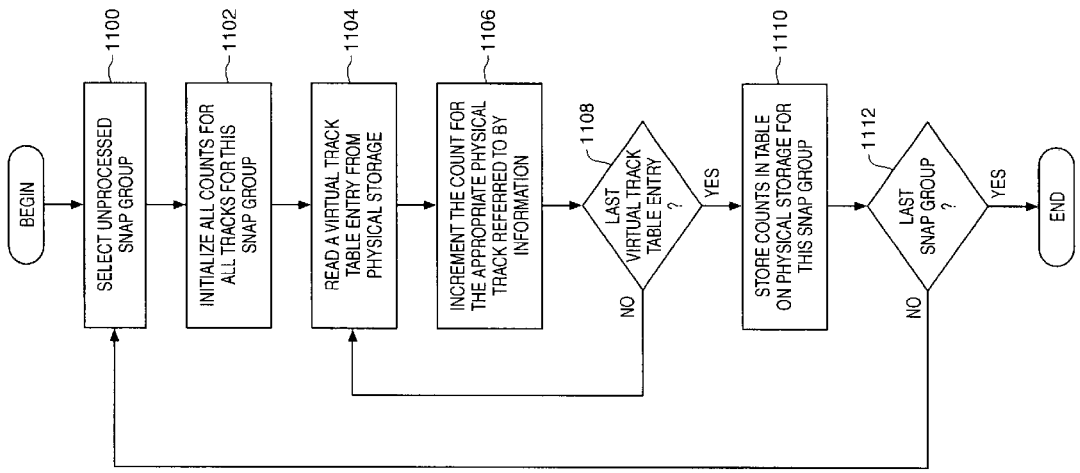
FIG. 11 is a flowchart of a reference count regenerating process in accordance with a preferred embodiment of the present invention.

With reference now to FIG. 11, a flowchart of a reference count regenerating process is depicted in accordance with a preferred embodiment of the present invention. The process begins by selecting an unprocessed snap group for processing (step 1100). All of the counts for all tracks for this snap group are initialized (step 1102). In step 1102, the counts are initialized by initializing a counter for each physical track. The number of physical tracks may vary depending on the references. In any event, the number of physical tracks will not be more than the number of virtual tracks located in the snap group. An unprocessed virtual track table entry is read from physical storage (step 1104). In reading a virtual track table entry, the pointer to the physical track is identified for the virtual track table entry. The count associated with the virtual track table entry is incremented for the appropriate physical track referred to by the information for the virtual track table entry (step 1106). In step 1106, a counter associated with the physical track is incremented. This physical track is the one referred to in the information identified from reading the virtual track table entry.

Next, a determination is made as to whether the virtual track table entry read from physical storage is the last virtual track table entry (step 1108). If the virtual track table entry is not the last virtual track table entry, the process returns to step 1104. Otherwise, the counts are stored in a table for the physical storage for this particular snap group (step 1110). This count information may be stored in various data structures other than a table. Further, in the depicted example, this data structure is stored on the same physical disk drive as the data. A determination is then made as to whether the snap group is the last snap group to be processed (step 1112). If the snap group is the last snap group, the process terminates. Otherwise, the process returns to step 1100 to select another unprocessed snap group for processing.

Further, with snap groups, administrators can create policies that assign snap groups to different users of the disk subsystem. By using snap groups, users are restricted to only perform snap operations between volumes that are within a snap group. By doing this, customers cannot consume all of the virtual addresses across all the virtual volumes. Since snap operations do not consume any additional space on the physical drives, quotas that are based on the amount of physical space consumed are not relevant to snapshot copy operations. Additionally, with snapshot groups, restrictions may be placed on where snapshot copy operations occur based on locality of storage subsystems within a distributed network.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. For example, although the volumes in the examples are virtual volumes, the processes of the present invention also may be applied to physical volumes. Further, the snap group information may be stored in data structures other than a table. A data structure, such as a linked list or a database, also could be used. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing data access to a plurality of storage devices, the method comprising:

grouping the plurality of storage devices into a set of groups;

responsive to a request for a copy operation to copy data from a first storage device to a second storage device, determining whether the first storage device and the second storage device are in a same group within the set of groups;

responsive to the first storage device and the second storage device being in the same group, creating a pointer to the data in the first storage device, wherein the pointer is associated with the second storage device; and responsive to an absence of the first storage device and the second storage device being in the same group, preventing the copy operation from occurring.

2. The method of claim 1 further comprising:

performing a reference count regeneration to recreate a total count of virtual tracks that refer to each physical track stored in physical storage.

3. The method of claim 2, wherein the step of performing includes:

scanning a set of virtual tracks associated with the plurality of storage devices; and identifying a number of virtual tracks referencing each physical track.

4. The method of claim 3, wherein the number of virtual tracks is maintained using a counter for each physical track.

5. The method of claim 3, wherein the set of virtual tracks is scanned only once.

6. The method of claim 2, wherein the step of performing comprises:

initializing a counter for each physical track within a group within the set of groups;

reading a virtual track table entry for a virtual track within the set of virtual tracks within the group;

for the physical track referenced by the virtual track table entry, incrementing the counter for the physical track referenced by the virtual track table entry; and repeating the initializing, reading, and incrementing steps for each group within the plurality of groups.

7. The method of claim 1, wherein the plurality of storage devices are a plurality of virtual storage devices.

8. The method of claim 1, wherein the pointer is stored in a table.

9. The method of claim 1 further comprising:

adding a new group to the set of groups.

10. The method of claim 1 further comprising:

removing a group from the set of groups.

11. The method of claim 1, wherein the pointer is a pointer to a data file identifier referencing the data file in the first storage device.

12. The method of claim 1 further comprising:

adding a volume to a group within the set of groups.

13. The method of claim 1 further comprising:

removing a volume from a group within the set of groups.

14. A method in a data processing system for performing snapshot copy operations, the method comprising:

receiving a request for the snapshot copy operation involving a source volume and a target volume;

responsive to receiving the request, determining whether the source volume and the target volume are in the same snap group;

responsive to the source volume and the target volume being in a same snap group, performing the snapshot copy operation; and responsive to the source volume and the target volume being in different snap groups, preventing the snapshot copy operation.

15. The method of claim 14 further comprising:
performing a reference count regeneration to recreate a total count of virtual tracks that refer to each physical track stored in physical storage.

16. The method of claim 15, wherein the step of performing comprises:
scanning a set of virtual tracks associated with each snap group, wherein the set of virtual tracks is scanned only once; and
identifying a number of virtual tracks referencing each physical track.

17. The method of claim 15, wherein the step of performing comprises:
initializing a counter for each physical track within the snap group, wherein the snap group is unprocessed;
reading a virtual track table entry for a virtual track within a set of virtual tracks within the snap group;
for the physical track referenced by the virtual track table entry, incrementing the counter for the physical track referenced by the virtual track table entry; and
repeating the initializing, reading, and incrementing steps for each unprocessed snap group.

18. A storage system comprising:
a plurality of storage devices; and
a controller, wherein the controller monitors for a request for a copy operation involving a source storage device and a target storage device, determines whether the source device and the target device are in a same group in response to receiving the request, allowing the copy operation to occur only in response to the source storage device and the target storage device being in the same group.

19. The storage system of claim 18, wherein the controller performs a reference count regeneration to recreate a total count of virtual tracks that refer to each physical track stored in physical storage in which virtual tracks are only scanned once to recreate the total count.

20. The storage system of claim 18, wherein the controller is a processor in the storage system.

21. A data processing system for managing data access to a plurality of storage devices, the data processing system comprising:
grouping means for grouping the plurality of storage devices into a set of groups;
determining means, responsive to a request for a copy operation to copy data from a first storage device to a second storage device, for determining whether the first storage device and the second storage device are in a same group within a set of groups;
storing means, responsive to the first storage device and the second storage device being in the same group, for creating a pointer to the data in the first storage device, wherein the pointer is associated with the second storage device; and
preventing means, responsive to an absence of the first storage device and the second storage device being in the same group, for preventing the copy operation from occurring.

22. The data processing system of claim 21 further comprising:
performing means for performing a reference count regeneration to recreate a total count of virtual tracks that refer to each physical track stored in physical storage.

23. The data processing system of claim 22, wherein the performing means includes:

scanning means for scanning a set of virtual tracks associated with the plurality of storage devices; and
identifying means for identifying a number of virtual tracks referencing each physical track.

24. The data processing system of claim 23, wherein the set of virtual tracks is scanned only once.

25. The data processing system of claim 23, wherein the number of virtual tracks is maintained using a counter for each physical track.

26. The data processing system of claim 23, wherein the performing means comprises:
initializing means for initializing a counter for each physical track within a group within the set of groups;
reading means for reading a virtual track table entry for a virtual track within the set of virtual tracks within the group;
for the physical track referenced by the virtual track table entry, incrementing means for incrementing the counter for the physical track referenced by the virtual track table entry; and
repeating means for repeating the initializing means, reading means, and incrementing means for each group within the plurality of groups.

27. The data processing system of claim 21, wherein the plurality of storage devices are a plurality of virtual storage devices.

28. The data processing system of claim 21, wherein the data file pointer is stored in a table.

29. The data processing system of claim 21 further comprising:
adding means for adding a new group to the set of groups.

30. The data processing system of claim 21 further comprising:
removing means for removing a group from the set of groups.

31. The data processing system of claim 21, wherein the pointer is a pointer to a data file identifier referencing the data file in the first storage device.

32. The data processing system of claim 21 further comprising:
adding means for adding a volume to a group within the set of groups.

33. The data processing system of claim 21 further comprising:
removing means for removing a volume from a group within the set of groups.

34. A data processing system for performing snapshot copy operations, the data processing system comprising:
receiving means for receiving a request for the snapshot copy operation involving a source volume and a target volume;
determining means, responsive to receiving the request, for determining whether the source volume and the target volume are in a same snap group;
performing means, responsive to the source volume and the target volume being in a same snap group, for performing the snapshot copy operation; and
preventing means, responsive to the source volume and the target volume being in different snap groups, for preventing the snapshot copy operation.

35. The data processing system of claim 34 further comprising:
performing means for performing a reference count regeneration to recreate a total count of virtual tracks that refer to each physical track stored in physical storage.

36. The data processing system of claim 35, wherein the performing means comprises:

scanning means for scanning a set of virtual tracks associated with each snap group, wherein the set of virtual tracks is scanned only once; and identifying means for identifying a number of virtual tracks referencing each physical track.

37. The data processing system of claim 35, wherein the performing means comprises:

initializing means for initializing a counter for each physical track within the snap group, wherein the snap group is unprocessed;

reading means for reading a virtual track table entry for a virtual track within a set of virtual tracks within the snap group;

for the physical track referenced by the virtual track table entry, incrementing means for incrementing the counter for the physical track referenced by the virtual track table entry; and repeating means for repeating the initializing means, reading means, and incrementing means for each unprocessed snap group.

38. A computer program product in a computer readable medium for managing data access to a plurality of storage devices, the computer program product comprising:

first instructions for grouping the plurality of storage devices into a set of groups;

second instructions, responsive to a request for a copy operation to copy data from a first storage device to a second storage device, for determining whether the first storage device and the second storage device are in a same group within a set of groups;

third instructions, responsive to the first storage device and the second storage device being in the same group, for storing a data file pointer to the data in a data structure for the second storage device; and fourth instructions, responsive to an absence of the first storage device and the second storage device being in the same group, for preventing the copy operation from occurring.

39. A computer program product in a computer readable medium for performing snapshot copy operations, the computer program product comprising:

first instructions for receiving a request for the snapshot copy operation involving a source volume and a target volume;

second instructions, responsive to receiving the request, for determining whether the source volume and the target volume are in a same snap group;

third instructions, responsive to the source volume and the target volume being in the same snap group, for performing the snapshot copy operation; and fourth instructions, responsive to the source volume and the target volume being in different snap groups, for preventing the snapshot copy operation.

\* \* \* \* \*